Patented June 17, 1941

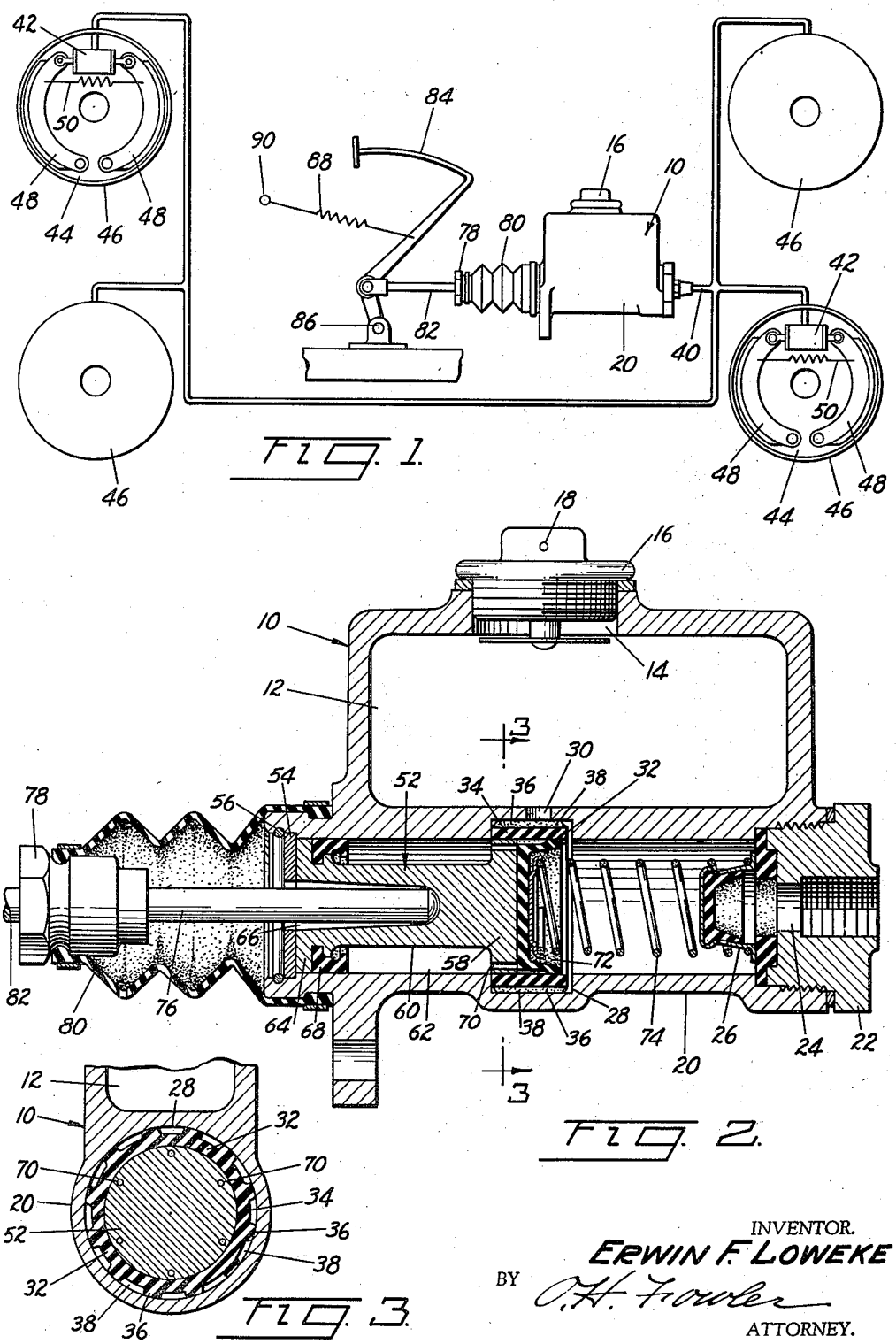
June 17, 1941. E. F. LOWEKE 2,245,991
FLUID PRESSURE BRAKING SYSTEM
Filed May 31, 1938
INVENTOR.
ERWIN F. LOWEKE
BY
ATTORNEY.

2,245,991

UNITED STATES PATENT OFFICE 2,245,991

FLUID PRESSURE BRAKING SYSTEM

Erwin F. Loweke, Detroit, Mich., assignor to Hydraulic Brake Company, Detroit, Mich., a corporation of California Application May 31, 1938, Serial No. 211,011

4 Claims. (Cl. 60—54.6)

This invention relates to fluid pressure braking systems, and more particularly to fluid pressure producing devices for such systems.

Many types of fluid pressure producing devices include a cylinder, a piston movable in the cylinder, and a sealing cup carried on the head of the piston. Generally in such devices the cylinder has in its wall a supply port and a compensating port, and the latter is so arranged that it is positioned just forward of the sealing cup when the piston is in retracted position. Accordingly, when the piston is moved on its compression stroke, pressure created in the cylinder forces a small portion of the lip of the cup into the compensating port, resulting in cutting the cup and thus rendering it ineffective. The present invention aims to overcome this difficulty.

An object of the invention is to provide a fluid pressure producing device including a cylinder having a port, a piston movable in the cylinder, and means actuated by the piston for control of the port.

Another object of the invention is to provide a fluid pressure producing device including a cylinder having an internal annular slot, a port communicating with the slot, a ring in the slot providing a shiftable section of the bore of the cylinder adapted to open and close the port, and a piston reciprocable in the cylinder adapted to shift the ring at the beginning of its compression stroke and at the end of its retraction stroke.

Yet another object of the invention is to provide a fluid pressure producing device including a cylinder, a piston reciprocable in the cylinder, a sealing cup on its head, and means providing for flow of fluid to and from the cylinder without injury to the cup.

Other objects of the invention will appear from the following description taken in connection with the drawing forming a part of this specification, and in which—

Fig. 1 is a schematic view of a fluid pressure braking system embodying the invention;

Fig. 2 is a vertical sectional view of the fluid pressure producing device; and

Fig. 3 is a sectional view substantially on line 3—3, Fig. 2.

Referring to the drawing for more specific details of the invention, 10 represents generally a fluid pressure producing device including a fluid reservoir 12 having a filling opening 14 normally closed as by a plug 16 having openings 18 therethrough for venting the reservoir to the atmosphere.

The reservoir has at its base a cylinder 20, open at one end, and closed at its other end as by a head 22 having a discharge port 24 controlled by a two-way valve 26, and arranged in the wall of the cylinder is an internal circumferential slot communicating with the reservoir as by a port 30, and slidably mounted in the slot 28 is a ring 32.

Preferably the ring 32 is made of rubber so that it may be easily distorted and inserted in the slot 28. As shown, the ring has a body portion 34 of a width slightly shorter than the width of the slot 28. The inner diameter of the body portion 34 is substantially equal to the inner diameter of the cylinder, and formed on the periphery of the body portion in spaced relation are a plurality of longitudinal ribs 36 providing a plurality of channels 38. The outer diameter of the ring, including the body portion and ribs 36, is substantially equal to the diameter of the slot 28 so that when the ring is placed in the slot the inner diameter of the ring may be maintained in alignment with the bore of the cylinder.

A fluid pressure delivery pipe or conduit 40 connected to the discharge port 24 has branches connected respectively to fluid pressure actuated motors 42, preferably arranged in pairs, one pair for actuating the brakes associated with the front wheels of the vehicle and another pair for actuating the brakes associated with the rear wheels of the vehicle.

As shown, the brakes are of a preferred type, including a fixed support or backing plate 44 adapted to be secured to an axle or to an axle housing, a rotatable drum 46 associated with the backing plate adapted to be secured to a wheel, a pair of corresponding interchangeable friction elements or shoes 48 pivoted on the backing plate for cooperation with the drum, a retractile spring 50 connecting the shoes, and a motor corresponding to the motors 42 mounted on the backing plate between the shoes and connected thereto for actuating the shoes into engagement with the drum against the resistance of the retractile spring.

A piston 52 reciprocable in the cylinder 20 is held against displacement by a washer 54 seated on a shoulder in the open end of the cylinder and secured in place by a retaining ring 56 seated in a groove in the wall of the cylinder. The piston 52 includes a head 58, a reduced body portion 60 providing in conjunction with the wall of the cylinder an annular chamber 62, and a skirt 64 having a concentric socket 66 extended well into the body portion. The skirt carries a sealing cup 68 for inhibiting seepage of fluid from the annular chamber 62 past the skirt, and the head has a plurality of spaced passages 70 therethrough providing communications between the annular chamber 62 and that portion of the cylinder forward of the piston.

A sealing cup 72 seated on the head of the piston controls the passages 70, and a spring 74 interposed between the sealing cup and the two-way valve serves to retain the cup and valve against displacement and also to return the piston to its retracted position wherein the cup is received by the ring 32 after the ring has moved to its seat on the rear wall of the slot 28 so as to establish communication between the reservoir and that portion of the cylinder 20 forward of the piston.

The recess 66 in the piston receives one end of a thrust pin 76, and the other end of the thrust pin is received by a coupling 78 connected by a flexible dust shield or boot 80 to the open end of the cylinder. A thrust rod 82 has one end attached to the coupling 78 and its other end pivotally connected to a foot pedal lever 84 rockable on a stub shaft 86 and connected by a retractile spring 88 to a fixed support 90.

In a normal operation, upon depressing the foot pedal lever 84, force is transmitted therefrom through the thrust rod 82 and thrust pin 76 to the piston 52, resulting in moving the piston on its compression stroke. During the initial movement of the piston on its compression stroke, slight frictional resistance to relative movement of the sealing cup 72 on the head of the piston and the ring 32 results in advancing the ring until it abuts the forward wall of the slot 28. This movement of the ring closes communication between the reservoir and that portion of the cylinder forward of the piston and establishes communication between the reservoir and the annular chamber 62 back of the head of the piston.

As the piston advances on its compression stroke, the fluid in the cylinder forward of the piston is displaced therefrom, past the two-way valve 26, through the discharge port 24, and fluid pressure delivery pipe or conduit 40, into the fluid pressure actuated motors 42, causing energization of the motors with the resultant actuation of the respective brakes.

Upon concluding a braking operation, the foot pedal lever 84 is released, whereupon the lever is returned to its retracted position under the influence of the retractile spring 88, and as the lever returns to its retracted position it retracts the thrust rod 82 and thrust pin 76. This results in release of the piston 52, whereupon the piston is returned to its retracted position under the influence of the retractile spring 74.

This movement of the piston results in the creation of a partial vacuum in that portion of the cylinder forward of the piston, and because of this vacuum fluid is drawn from the reservoir, through the port 30, past the ring 32, into the annular chamber 62, thence through the passages 70 in the head of the piston, past the sealing cup 72, into that portion of the cylinder forward of the piston, completely filling the cylinder.

As the piston nears its retracted position, the head of the piston enters the ring 32, and the cup 72 on the head of the piston frictionally engages the ring, resulting in retraction of the ring until it abuts the rear wall of the slot 28. This movement of the ring closes communication between the reservoir and the annular chamber 62 back of the head of the piston and establishes communication between the reservoir and that portion of the cylinder forward of the piston.

During this operation, fluid is returning to the cylinder 20 from the fluid pressure actuated motors 42 and the fluid pressure delivery piping system connecting the motors to the cylinder under the influence of the retractile springs 50 connecting the shoes 48 of the respective brakes. This results in the cylinder receiving a quantity of fluid in excess of its capacity, and such excess fluid is displaced therefrom through the slot 28, past the ring 32, and through the port 30 into the reservoir.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A fluid pressure producing device comprising a cylinder having an inlet port, a discharge port, and an internal annular slot communicating with the inlet port, a ring slidable in the slot having an inner diameter complementary to the bore of the cylinder and a slotted perimeter, and a piston reciprocable in the ring and cylinder adapted to frictionally grip and shift the ring on both its forward and compression strokes.

2. A fluid pressure producing device comprising a cylinder having an inlet port, a discharge port, and an internal annular slot communicating with the inlet port, a ring slidable in the slot having a transversely grooved periphery, a piston reciprocable in the cylinder and ring, and a sealing cup on the head of the piston frictionally embraced by the ring and adapted to shift the ring on both the compression and retraction strokes of the piston.

3. A fluid pressure producing device comprising a cylinder having an inlet port, a discharge port, and an internal annular slot communicating with the inlet port, a ring slidable in the slot having an inner diameter complementary to the bore of the cylinder and a transversely grooved perimeter, a piston reciprocable in the cylinder and ring, and a sealing cup on the head of the piston adapted to telescope the ring when the piston is in retracted position and to frictionally grip and move the ring on both the compression and retraction strokes of the piston.

4. A fluid pressure producing device comprising a cylinder having an inlet port, a discharge port, and an internal annular slot communicating with the inlet port, a transversely channeled ring fitted in the slot for axial movement having an inner diameter complementary to the bore of the cylinder, a piston reciprocable in the cylinder and ring, and a flexible sealing cup on the head of the piston adapted to enter and frictionally engage the ring and to move the ring when the piston is advanced and retracted.

ERWIN F. LOWEKE.